United States Patent
Dai

(10) Patent No.: US 6,699,623 B1
(45) Date of Patent: Mar. 2, 2004

(54) HIGH PERFORMANCE LITHIUM OR LITHIUM ION CELL

(75) Inventor: Hongli Dai, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/684,206

(22) Filed: Oct. 6, 2000

Related U.S. Application Data

(60) Provisional application No. 60/205,027, filed on May 18, 2000, and provisional application No. 60/199,700, filed on Apr. 26, 2000.

(51) Int. Cl.[7] .................................................. H01M 6/18

(52) U.S. Cl. ..................... 429/306; 429/231.1; 429/245; 429/324

(58) Field of Search .................................. 429/306, 307, 429/314, 321, 324, 231.1, 245; 29/623.3, 623.4, 623.5

(56) References Cited

U.S. PATENT DOCUMENTS

| 3,645,792 A | * | 2/1972 | Hacha ........................... 136/6 |
| 5,456,000 A | * | 10/1995 | Gozdz et al. .............. 29/623.2 |
| 5,494,762 A |   | 2/1996 | Isoyama et al. |

FOREIGN PATENT DOCUMENTS

| EP | 0731518 | 9/1996 |
| EP | 0807985 | 11/1997 |
| JP | 2001-52744 | 2/2001 |
| WO | WO 9930381 | 6/1999 |
| WO | WO 0011742 | 3/2000 |

* cited by examiner

*Primary Examiner*—Patrick Ryan
*Assistant Examiner*—R Alejandro

(57) ABSTRACT

Graphite sheeting having a thickness of less than 250 micrometers and in-plane conductivity of at least 100 S/cm when employed as a cathode current collector in a lithium or lithium ion cell containing a fluorinated lithium imide or methide electrolyte salt imparts high thermal resistance, excellent electrochemical stability, and surprisingly high capacity retention at high rates of discharge.

16 Claims, 3 Drawing Sheets

HIGH PERFORMANCE LITHIUM OR LITHIUM ION CELL

This application claims benefit of Provisional Application Ser. No. 60/199,700 filed Apr. 26, 2000, and claims benefit of Ser. No. 60/205,027 filed May 18, 2000.

FIELD OF THE INVENTION

The present invention deals with lithium and lithium-ion batteries which exhibit surprisingly high capacity retention at high discharge rates and long cycle life, and with an elevated temperature melt process for the fabrication thereof.

TECHNICAL BACKGROUND OF THE INVENTION

It is known in the art to employ graphite current collectors in electrochemical cells, particularly in environments which present a risk of corrosion for metal collectors. The metal collectors, except for this potential corrosion, are preferred for their high current-carrying capability. In some cases noble metals are employed but their high costs preclude their use in most commercial applications. Most typically aluminum and copper are the materials of choice for current collectors in lithium and lithium-ion cells.

Toyuguchi et al., *JP-A Sho* 58(1983)-115777, discloses an artificial graphite plate current collector employed in a lithium metal/polyacetylene cell wherein a solution of $LiClO_4$ in propylene carbonate or lithium tetrafluoroborate in gamma-butyrolactone is employed as the electrolyte. Charging efficiency is shown to be much improved over comparable cells having metal current collectors. Charging efficiency was determined utilizing charge-discharge cycles of 2 hours or longer, that is the currents employed represent no more than 50% of that required to discharge the cell in one hour. The cell employed by Toyuguchi is not a lithium-ion cell.

British Patent Specification 1,214,4123, to the Standard Oil Company, discloses the use of a flexible graphite sheet as a current collector embedded in a carbon electrode useful in a molten salt battery involving the use of binary salt electrolytes, primarily a combination of LiCl and KCl. The graphite sheet was of a thickness of ca. 250 μm, and was characterized by electrical resistivity in the plane of the sheet of $8 \times 10^{-4}$ ohm-cm.

Gratzel et al., WO 99/59218, is drawn to a lithium or lithium-ion battery of which one electrode is composed of a solid material characterized by a mesoscopic morphology. Disclosed are secondary (rechargeable) cells wherein lithium bis(trifluorosulfonyl) imide or lithium tris (trifluorosulfonyl) methide may be employed as electrolytes in aprotic solvents. A cell comprising $TiO_2$ as the anode and $Li_yMn_2O_4$ as the cathode, a solution of lithium bis (trifluorosulfonyl) imide in methoxypropionitrile as the electrolyte solution, and a paper separator was found to sustain a 10C discharge rate and maintain a cell voltage of 1.5V. Current collectors are conducting indium tin oxide deposited on glass substrates. A $TiO_2$ anode is preferred over a carbon anode.

Fujimoto et al., JP Hei 5 (1993)-290887, discloses a secondary lithium-ion cell comprising a cathode of a lithium metal oxide compound, a cathode current collector of a graphite powder composite with polypropylene resin, an anode of powdered graphite, an anode current collector of a copper foil, and an electrolyte solution of $LiCF_3SO_3$ dissolved in a mixture of ethylene carbonate and dimethyl carbonate. The battery cell so formed is said to provide improvements over the existing state of the art cells which employ $LiPF_6$ electrolyte in conjunction with cathode current collectors of aluminum, the improvements being a reduction in explosion hazard in a short circuit, and the charge discharge characteristics improved. A cell having a capacity of 500 mA-h was discharged at 200 mA in the voltage range of 4.1 to 3 volts; a very high percentage of the capacity was utilized, and restored upon recharging.

SUMMARY OF THE INVENTION

The present invention provides for a lithium or lithium-ion electrochemical cell, the cell comprising an anode, an anode current collector in electronically conductive contact with said anode, a cathode exhibiting an upper charging voltage in the range of 3 to 5 volts with respect to a $Li/Li^+$ reference electrode, said cathode comprising a lithium insertion transition metal oxide, phosphate, or sulfate in electronically conductive contact with a cathode current collector having a thickness of less than 250 micrometers comprising graphite said graphite being characterized by a bulk density in the range of 0.08–2.25 g/cc, an electrical conductivity of at least 500 Siemens/cm, and said electronically conductive contact being characterized by a resistance of less than 50 ohm-cm$^2$; an ion-permeable membrane as a separator between said cathode and anode, and an electrolyte solution being in ionically conductive contact with said anode and cathode, the electrolyte solution comprising an aprotic polar solvent and a lithium compound at a concentration in the range of 0.2 up to 3 molar, said lithium compound being represented by the formula $$R_f^1 SO_2 X^- (Li^+) YZ_a$$

wherein X is C or N, a=0 or 1 with the proviso that a=1 when X is C and a=0 when X is N; wherein when a=1, Y and Z independently are electron-withdrawing groups selected from the group consisting of CN, $SO_2R_f^2$, $SO_2R$, $P(O)(OR)_2$, $CO_2R$, $P(O)R_2$, $C(O)R_f^3$, C(O)R, cycloalkenyl groups formed therewith, and, H, with the proviso that Y and Z cannot both be H; wherein further $R_f^1$, $R_f^2$ and $R_f^3$ are perfluoroalkyl radicals of 1–4 carbons optionally substituted with one or more ether oxygens; R is an alkyl group of 1–6 carbons optionally substituted with one or more ether oxygens, or an aryl group optionally further substituted; or wherein, when a=0, Y is an electron-withdrawing group represented by the formula $-SO_2R_f^6$ where $R_f^6$ is the radical represented by the formula 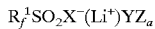$R_f^5$ where m=0 or 1, and $R_f^4$ is $-C_nF_{2n}-$ and $R_f^5$ is $-C_nF_{2n+1}$ where n=1–4, optionally substituted with one or more ether oxygens.

The present invention further provides for a process for forming an electrochemical cell, the process comprising forming a melt processible composition by combining in a vessel provided with a mixing means a polymer, a mixture of one or more polar aprotic liquids, and a lithium compound; mixing said composition at least until it is plastically formable; and, forming a sheet from said plastically formable composition by the application of heat and/or pressure thereto; layering said sheet with a graphite current collector sheet having a bulk density of 0.08–2.25 g/cc, a thickness of less than 250 micrometers and a conductivity of at least 500 Siemens/cm and such other components as are required to make an electrochemical cell; and, consolidating said layered shaped articles so that the layers are in electrically and/or ionically conductive contact as necessary to form an electrochemical cell, said lithium compound represented by the formula $$R_f^1SO_2X^-(Li^+)YZ_a$$

wherein X is C or N, a=0 or 1 with the proviso that a=1 when X is C and a=0 when X is N; wherein when a=1, Y and Z independently are electron-withdrawing groups selected from the group consisting of CN, $SO_2R_f^2$, $SO_2R$, $P(O)(OR)_2$, $CO_2R$, $P(O)R_2$, $C(O)R_f^3$, $C(O)R$, cycloalkenyl groups formed therewith, and, H, with the proviso that Y and Z cannot both be H; wherein further $R_f^1$, $R_f^2$ and $R_f^3$ are perfluoroalkyl radicals of 1–4 carbons optionally substituted with one or more ether oxygens; R is an alkyl group of 1–6 carbons optionally substituted with one or more ether oxygens, or an aryl group optionally further substituted; or wherein, when a=0, Y is an electron-withdrawing group represented by the formula $-SO_2R_f^6$ where $R_f^6$ is the radical represented by the formula $-(R_f^4SO_2N^-(Li^+)SO_2)_m R_f^5$ where m=0 or 1, and $R_f^4$ is $-C_nF_{2n}-$ and $R_f^5$ is $-C_nF_{2n+1}$ where n=1–4, optionally substituted with one or more ether oxygens.

DETAILED DESCRIPTION

The present invention provides several surprising and important benefits over the art of lithium-ion batteries. In the present state of the art, $LiPF_6$ dissolved in an aprotic solvent mixture is typically combined with an aluminum current collector on the cathode side of a ca. 3 volt or higher lithium-ion battery because it represents a good trade-off of several desired attributes which are well known to one of skill in the art. However, $LiPF_6$ exhibits some drawbacks, as outlined in Fujimoto et al., op.cit. A major drawback of $LiPF_6$ is a lack of thermal stability which seriously limits both the operating temperature of the battery and largely precludes any battery manufacturing process which requires heating the $LiPF_6$ above a temperature of about 100° C. This is a particularly serious limitation in a manufacturing process based upon melt processing the components of a lithium cell such as that described in Doyle et al., U.S. Pat. No. 6,025,092.

Fujimoto et al., op.cit., propose to replace $LiPF_6$ with $CF_3SO_3^-Li^+$ which provides a remedy to the drawbacks noted therein, and further provides superior thermal stability. A graphite composite current collector, made from graphite powder and a polymeric binder selected from polyethylene, polypropylene, or polyethylene terephthalate is substituted for the standard aluminum because of the corrosiveness of the $CF_3SO_3^-Li^+$ salt. However, as shown herein below, $CF_3SO_3^-Li^+$ causes a catastrophic loss of capacity retention at high discharge rates compared to the $LiPF_6$ systems, thus eliminating batteries based upon $CF_3SO_3^-Li^+$ from any application requiring any but relatively low discharge rates. In the present invention, the imide and methide salts herein described in combination with a pure graphite foil cathode current collector provide cells of surprisingly high capacity retention at high rates of discharge and high cycle life together with high thermal stability. It is a particularly surprising result, however, that in the preferred embodiment of the present invention, the capacity retention at high rates exceeds that of the current state of the art which comprises $LiPF_6$ in combination with an aluminum current collector. In other words, the lithium-ion battery cell of the present invention is capable of providing higher power than the $LiPF_6$/aluminum cell. When one considers the orders of magnitude higher conductivity of aluminum versus graphite, this is a remarkable result.

In a preferred embodiment, the electrode composition of the invention is formed into a sheet or film by any suitable method known in the art, and contacted with the current collector to form a laminated structure.

Figure 1:
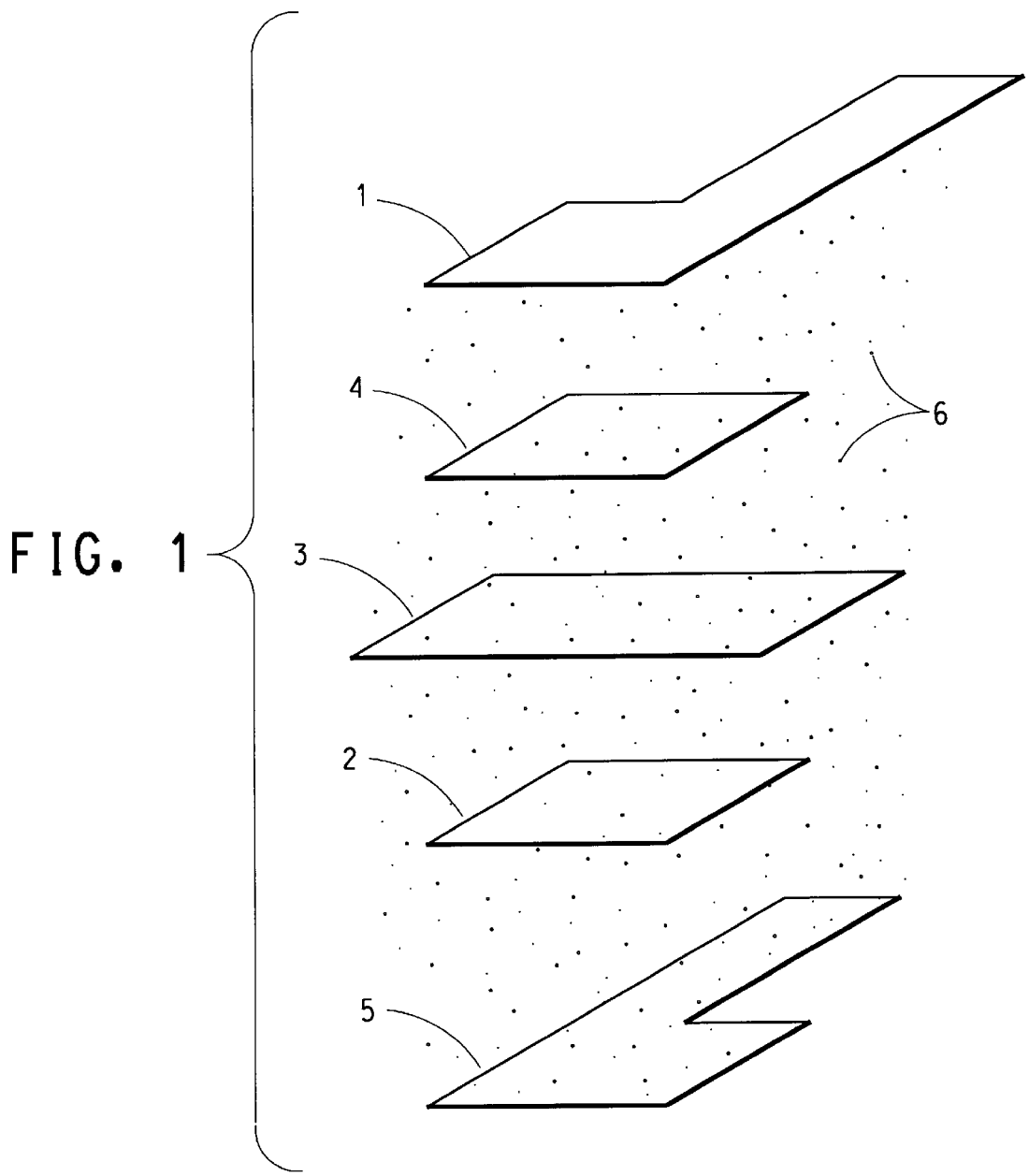
FIG. 1 shows a lithium battery cell in one embodiment of the present invention.

One embodiment of the lithium battery cell of the present invention, shown in FIG. 1, comprises a cathode current collector of graphite foil, 1, an anode comprising an anode active material, 2, a separator, 3, a cathode comprising a cathode active material, 4, a copper mesh anode current collector, 5, and an electrolyte solution, 6, comprising an aprotic solvent and a lithium compound, said electrolyte solution, and said electrodes being in ionically conductive contact with each other, and said lithium compound being represented by the formula $$R_f^1SO_2X^-(Li^+)YZ_a$$

wherein X is C or N, a=0 or 1 with the proviso that a=1 when X is C and a=0 when X is N; wherein when a=1, Y and Z independently are electron-withdrawing groups selected from the group consisting of CN, $SO_2R_f^2$, $SO_2R$, $P(O)(OR)_2$, $CO_2R$, $P(O)R_2$, $C(O)R_f^3$, $C(O)R$, cycloalkenyl groups formed therewith, and, H, with the proviso that Y and Z cannot both be H; wherein further $R_f^1$, $R_f^2$ and $R_f^3$ are perfluoroalkyl radicals of 1–4 carbons optionally substituted with one or more ether oxygens; R is an alkyl group of 1–6 carbons optionally substituted with one or more ether oxygens, or an aryl group optionally further substituted; or wherein, when a=0, Y is an electron-withdrawing group represented by the formula $-SO_2R_f^6$ where $R_f^6$ is the radical represented by the formula $-(R_f^4SO_2N^-(Li^+)SO_2)_m R_f^5$ where m=0 or 1, and $R_f^4$ is $-C_nF_{2n}-$ and $R_f^5$ is $-C_nF_{2n+1}$ where n=1–4, optionally substituted with one or more ether oxygens.

The present invention pertains to both lithium and lithium-ion cells. For the purposes of this invention, "lithium cell" refers to a lithium battery having anodes comprising anode active materials such as Li metal and Li metallic alloys, and cathodes comprising active cathode materials whose charge storage and release mechanism involves the insertion and deinsertion of Li ions. The term "lithium-ion cell" refers to a lithium battery having both anode and cathode comprising active electrode materials whose charge storage and release mechanism involves the insertion and deinsertion of Li ions. In a preferred embodiment, this is accomplished by intercalation and deintercalation in and out of a layered structure.

The preferred anode for use in the practice of the present invention comprises either lithium metal or a mixture of one or more anode active materials in particulate form, a binder, preferably a polymeric binder, optionally an electron conductive additive, and at least one organic carbonate. Examples of useful anode active materials include, but are not limited to, lithium metal, carbon (graphites, coke-type, mesocarbons, polyacenes, carbon fibers, and the like). Anode-active materials also include lithium-intercalated carbon, lithium metal nitrides such as $Li_{2.6}Co_{0.4}N$, metallic lithium alloys such as LiAl or $Li_4Sn$, lithium-alloy-forming compounds of tin, silicon, antimony, or aluminum such as those disclosed in "Active/Inactive Nanocomposites as Anodes for Li-Ion Batteries," by 0. Mao et al. in *Electrochemical and Solid State Letters*, 2 (1), p. 3, 1999. Further included as anode-active materials are metal oxides such as titanium oxides, iron oxides, or tin oxides. When present in particulate form, the particle size of the anode active material should range from about 1 to 100 microns. Preferred anode active materials are graphites such as carbon microbeads, natural graphites, carbon fibers, or graphitic flake-type materials. Especially preferred are graphite microbeads such as those produced by Osaka Gas in Japan (MCMB 25–28, 10–28, or 6–28).

Suitable conductive additives for the anode composition include carbons such as coke, carbon black, carbon fibers, and natural graphite, metallic flake or particles of copper, stainless steel, nickel or other relatively inert metals, conductive metal oxides such as titanium oxides or ruthenium oxides, or electronically-conductive polymers such as polyaniline or polypyrrole. Preferred are carbon blacks with relatively surface area below ca. 100 $m^2/g$ such as Super P and Super S carbon blacks available from MMM Carbon in Belgium.

In fabricating the cell of the invention where the anode active material is in particulate form, the anode may be formed by mixing and forming a composition comprising, by weight, 2–20%, preferably 3–10%, of a polymer binder, 10–50%, preferably 14–28%, of the electrolyte solution of the invention herein described, 40–80%, preferably 60–70%, of electrode-active material, and 0–5%, preferably 1–4%, of a conductive additive. Optionally up to 12% of an inert filler as hereinabove described may also be added, as may such other adjuvants as may be desired by one of skill in the art which do not substantively affect the achievement of the desirable results of the present invention. It is preferred that no inert filler be used.

The cell preferred for the practice of the present invention utilizes cathodes with an upper charging voltage of 3.5–4.5 volts versus a $Li/Li^+$ reference electrode. The upper charging voltage is the maximum voltage to which the cathode may be charged at a low rate of charge and with significant reversible storage capacity. However, cells utilizing cathodes with upper charging voltages from 3–5 volts versus a $Li/Li^+$ reference electrode are also suitable. Compositions suitable for use as an electrode-active material in the cathode composition include transition metal oxides, phosphates and sulfates, and lithiated transition metal oxides, phosphates and sulfates. Preferred are oxides such as $LiCoO_2$, spinel $LiMn_2O_4$, chromium-doped spinel lithium manganese oxides $Li_xCr_yMn_2O_4$, layered $LiMnO_2$, $LiNiO_2$, $LiNi_xCo_{1-x}O_2$ where x is $0<x<1$, with a preferred range of $0.5<x<0.95$, and vanadium oxides such as $LiV_2O_5$, $LiV_6O_{13}$, or the foregoing compounds modified in that the compositions thereof are nonstoichiometric, disordered, amorphous, overlithiated, or underlithiated forms such as are known in the art. The suitable cathode-active compounds may be further modified by doping with less than 5% of divalent or trivalent metallic cations such as $Fe^{2+}$, $Ti^{2+}$, $Zn^{2+}$, $Ni^{2+}$, $Co^{2+}$, $Cu^{2+}$, $Mg^{2+}$, $Cr^{3+}$, $Fe^{3+}$, $Al^{3+}$, $Ni^{3+}$, $Co^{3+}$, or $Mn^{3+}$, and the like. Other cathode active materials suitable for the cathode composition include lithium insertion compounds with olivine structure such as $LiFePO_4$ and with NASICON structures such as $LiFeTi(SO_4)_3$, or those disclosed by J. B. Goodenough in "*Lithium Ion Batteries*" (Wiley-VCH press, Edited by M. Wasihara and O. Yamamoto). Particle size of the cathode active material should range from about 1 to 100 microns. Preferred are transition metal oxides such as $LiCoO_2$, $LiMn_2O_4$, $LiNiO_2$, and their derivatives as hereinabove described. $LiCoO_2$ is most preferred.

In forming an electrochemical cell of the invention, a cathode is formed by mixing and forming a composition comprising, by weight, 2–15%, preferably 4–8%, of a polymer binder, 10–50%, preferably 15–25%, of the electrolyte solution of the invention herein described, 40–85%, preferably 65–75%, of an electrode-active material, and 1–12%, preferably 4–8%, of a conductive additive. Optionally, up to 12% of an inert filler may also be added, as may such other adjuvants as may be desired by one of skill in the art which do not substantively affect the achievement of the desirable results of the present invention. It is preferred that no inert filler be used.

The conductive additives suitable for use in the process of making a cathode are the same as those employed in making the anode as hereinabove described. As in the case of the anode, a highly preferred electron conductive aid is carbon black, particularly one of surface area less than ca. 100 $m^2/g$, most preferably Super P carbon black, available from the MMM S.A. Carbon, Brussels, Belgium.

In a preferred embodiment, graphite is the anode active material and $LiCoO_2$ is the cathode active material, the resulting cell having a cathode with an upper charging voltage of approximately 4.2 V versus a $Li/Li^+$ reference electrode.

The Li-ion cell preferred for the present invention may be assembled according to any method known in the art. In a first method in the art, exemplified by Nagamine et al. in U.S. Pat. No. 5,246,796, electrodes are solvent-cast onto current collectors, the collector/electrode tapes are spirally wound along with microporous polyolefin separator films to make a cylindrical roll, the winding placed into a metallic cell case, and the nonaqueous electrolyte solution impregnated into the wound cell. In a second method in the art, exemplified by Oliver et al. in U.S. Pat. No. 5,688,293 and Venuogopal et al. in U.S. Pat. No. 5,837,015, electrodes are solvent-cast onto current collectors and dried, the electrolyte and a polymeric gelling agent are coated onto the separators and/or the electrodes, the separators are laminated to, or brought in contact with, the collector/electrode tapes to make a cell subassembly, the cell subassemblies are then cut and stacked, or folded, or wound, then placed into a foil-laminate package, and finally heat treated to gel the electrolyte. In a third method in the art provided by Gozdz et al. in U.S. Pat. No. 5,456,000 and U.S. Pat. No. 5,540,741, electrodes and separators are solvent cast with also the addition of a plasticizer; the electrodes, mesh current collectors, electrodes and separators are laminated together to make a cell subassembly, the plasticizer is extracted using a volatile solvent, the subassembly is dried, then by contacting the subassembly with electrolyte the void space left by extraction of the plasticizer is filled with electrolyte to yield an activated cell, the subassembly(s) are optionally stacked, folded, or wound, and finally the cell is packaged in a foil laminate package. In a fourth method in the art, described in copending U.S. patent application Ser. No. 09/383,129, the electrode and separator materials are dried first, then combined with the salt and electrolyte solvent to make active compositions; by melt processing the electrodes and separator compositions are formed into films, the films are laminated to produce a cell subassembly, the subassembly(s) are stacked, folded, or wound and then packaged in a foil-laminate container. The third and fourth methods are exemplified in the specific embodiments of the present invention described below.

The cathode current collector suitable for the lithium or lithium-ion battery of the present invention comprises graphite. Highest conductivity is generally achieved in pure graphite, so it is preferred that the graphite sheeting contain as few binders, additives and impurities as possible in order to realize the benefits of the present invention. Binders, additives and impurities are also undesirable because of their potentially deleterious effects on battery performance.

The graphite current collector suitable for the present invention may be in the form of a powder coating on a substrate such as a metal substrate, a free-standing sheet, or a laminate. That is the current collector may be a composite structure having other members such as metal foils, adhesive layers and such other materials as may be considered desirable for a given application. However, in any event, according to the present invention, it is the graphite layer, or graphite layer in combination with an adhesion promoter, which is directly interfaced with the electrolyte of the present invention and is in electronically conductive contact with the electrode surface.

One particularly preferred form of graphite is the flexible low density graphite sheeting described in J. H. Shane et al., U. S. Pat. No. 3,404,061 which is herein incorporated by reference to the entirety, which offers the chemical, thermal, tensile, and electrical properties normally associated with graphite in combination with a highly desirable enhancement of the mechanical properties of flexibility, compactability, conformability, flexural toughness, and resilience. The flexible graphite sheeting preferred for the practice of the present invention exhibits a bulk density in the range of 0.08–2.25 g/cm$^3$, encompassing that of natural graphite, however the density is preferably 0.8–1.4 g/cm$^3$.

The flexible graphite sheeting preferred for the practice of the present invention is characterized by a thickness of at most 250 micrometers, with less than 125 micrometers preferred, and less than 75 micrometers most preferred. The flexible graphite sheeting preferred for the practice of the invention is further characterized by an electrical conductivity along the length and width of the sheeting of at least 100 Siemens/cm (S/cm), preferably at least 500 S/cm, most preferably at least 1000 S/cm measured according to ASTM standard C611-98.

The flexible graphite sheeting preferred for the practice of the present invention may be compounded with other ingredients as may be required for a particular application, but graphite having a purity of ca. 95% or greater is highly preferred.

At a thickness below about 10 $\mu$m, it may be expected that electrical resistance could be unduly high, so that thickness of less than about 10 $\mu$m is less preferred.

Strictly speaking, the operability of the present invention does not require the incorporation into the electrode composition of a binder. However, it is preferred in the art to employ a binder, particularly a polymeric binder, and it is preferred in the practice of the present invention as well. One of skill in the art will appreciate that many of the polymeric materials recited below as suitable for use as binders will also be useful for forming ion-permeable separator membranes suitable for use in the lithium or lithium-ion battery of the invention.

Suitable binders include, but are not limited to, polymeric binders, particularly gelled polymer electrolytes comprising polyacrylonitrile, poly(methylmethacrylate), poly(vinyl chloride), and polyvinylidene fluoride and copolymers thereof. Also, included are solid polymer electrolytes such as polyether-salt based electrolytes including poly(ethylene oxide)(PEO) and its derivatives, poly(propylene oxide) (PPO) and its derivatives, and poly(organophosphazenes) with ethyleneoxy or other side groups. Other suitable binders include fluorinated ionomers comprising partially or fully fluorinated polymer backbones, and having pendant groups comprising fluorinated sulfonate, imide, or methide lithium salts. Preferred binders include polyvinylidene fluoride and copolymers thereof with hexafluoropropylene, tetrafluoroethylene, fluorovinyl ethers, such as perfluoromethyl, perfluoroethyl, or perfluoropropyl vinyl ethers; and ionomers comprising monomer units of polyvinylidene fluoride and monomer units comprising pendant groups comprising fluorinated carboxylate, sulfonate, imide, or methide lithium salts.

Gelled polymer electrolytes are formed by combining the polymeric binder with a compatible suitable aprotic polar solvent and, where applicable, the electrolyte salt.

PEO and PPO-based polymeric binders can be used without solvents. Without solvents, they become solid polymer electrolytes which may offer advantages in safety and cycle life under some circumstances.

Other suitable binders include so-called "salt-in-polymer" compositions comprising polymers having greater than 50% by weight of one or more salts. See, for example, M. Forsyth et al, *Solid State Ionics,* 113, pp 161–163 (1998).

Also included as binders are glassy solid polymer electrolytes which are similar to the "salt-in-polymer" compositions except that the polymer is present in use at a temperature below its glass transition temperature and the salt concentrations are ca. 30% by weight.

Preferably, the volume fraction of the preferred binder in the finished electrode is between 4 and 40%.

Preferred electrolyte solvents are aprotic liquids or polymers. Included are organic carbonates such as are known in the art for use in Li-ion batteries are suitable for the practice of the present invention. Organic carbonates include propylene carbonate, dimethyl carbonate, ethylene carbonate and many related species. Also included are solid polymer electrolytes such as polyethers and poly(organo phosphazenes). Further included are lithium salt-containing ionic liquid mixtures such as are known in the art, including ionic liquids such as organic derivatives of the imidazolium cation with counterions based on imides, methides, $PF_6^-$, or $BF_4^-$. See for example D. R. MacFarlane et al., *Nature,* 402, 792 (1999).

Mixtures of suitable electrolyte solvents, including mixtures of liquid and polymeric electrolyte solvents are also suitable. Preferred electrolyte solvents are organic carbonates. Most preferred are mixtures of ethylene carbonate and dimethylcarbonate, ethylene carbonate and propylene carbonate, or ethylene carbonate, propylene carbonate, and diethylcarbonate.

The electrolyte solution suitable for the practice of the invention is formed by combining the lithium imide or methide salt herein described, with optionally a co-salt selected from $LiPF_6$, $LiPF_nR_{fm}$ where n+m=6 and $R_f=CF_3$ or $C_2F_5$, $LiBF_4$, $LiAsF_6$, or $LiClO_4$, along with the electrolyte solvent by dissolving, slurrying or melt mixing as appropriate to the particular materials. The present invention is operable when the concentration of the imide or methide salt is in the range of 0.2 to up to 3 molar, but 0.5 to 2 molar is preferred, with 0.8 to 1.2 molar most preferred. Depending on the fabrication method of the cell, the electrolyte solution may be added to the cell after winding or lamination to form the cell structure, or it may be introduced into the electrode or separator compositions before the final cell assembly.

The separator suitable for the lithium or lithium-ion battery of the present invention is any ion-permeable shaped article, preferably in the form of a thin film or sheet. Such separator may be a microporous film such as a microporous polypropylene, polyethylene, polytetrafluoroethylene and layered structures thereof. Suitable separators also include swellable polymers such as polyvinylidene fluoride and copolymers thereof. Other suitable separators include those known in the art of gelled polymer electrolytes such as poly(methyl methacrylate) and poly(vinyl chloride). Also suitable are polyethers such as poly(ethylene oxide) and poly(propylene oxide). Preferable are microporous polyolefin separators, separators comprising copolymers of vinylidene fluoride with hexafluoropropylene, perfluoromethyl vinyl ether, perfluoroethyl vinyl ether, or perfluoropropyl vinyl ether, including combinations thereof, or fluorinated ionomers, such as those described in Doyle et al., U.S. Pat. No. 6,025,092, an ionomer comprising a backbone of monomer units derived from vinylidene fluoride and a perfluoroalkenyl monomer having an ionic pendant group represented by the formula:

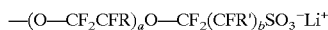

—(O—CF$_2$CFR)$_a$O—CF$_2$(CFR')$_b$SO$_3^-$Li$^+$ wherein R and R' are independently selected from F, Cl or a perfluorinated alkyl group having 1 to 10 carbon atoms, a=0, 1 or 2, b=0 to 6, and the imide and methide derivatives thereof as described in Feiring et al., WO 9945048(A1).

In the electrode suitable for use in the practice of the invention, the most preferred binders are polyvinylidene fluoride (PVDF) or a copolymer of polyvinylidene fluoride and hexafluoropropylene (p(VdF-HFP)) such as that available commercially under the trade name KYNAR FLEX® available from Elf Atochem North America, Philadelphia, Pa. The electrode of the invention may conveniently be made by dissolution of all polymeric components into a common solvent and mixing together with the carbon black particles and electrode active particles. For example, a preferred lithium battery electrode can be fabricated by dissolving PVDF in 1-methyl-2-pyrrolidinone or p(VdF-HFP) copolymer in acetone solvent, followed by addition of particles of electrode active material and carbon black, followed by deposition of a film on a substrate and drying. The resultant preferred electrode will comprise electrode active material, conductive carbon black, and polymer. This electrode can then be cast from solution onto a suitable support such as a glass plate or a current collector, and formed into a film using techniques well-known in the art.

In the present invention the cathode is brought into electronically conductive contact with the graphite current collector with as little contact resistance as possible. This may be advantageously accomplished by depositing upon the graphite sheet a thin layer of an adhesion promoter such as a mixture of an acrylic acid-ethylene copolymer and carbon black. Suitable contact may be achieved by the application of heat and/or pressure to provide intimate contact between the current collector and the electrode.

The flexible graphite sheeting preferred for the practice of the present invention provides particular advantages in achieving low contact resistance. By virtue of its high ductility, conformability, and toughness it can be made to form particularly intimate and therefore low resistance contacts with electrode structures that may intentionally or unintentionally proffer an uneven contact surface. In any event, in the practice of the present invention, the contact resistance between the cathode and the graphite current collector of the present invention does not exceed 50 ohm-cm$^2$, preferably does not exceed 10 ohms-cm$^2$, and most preferably does not exceed 2 ohms-cm$^2$. For the purpose of the present invention, contact resistance may be determined by any convenient method as known to one of ordinary skill in the art. Simple measurement with an ohm-meter is possible. It has been found to be convenient in the practice of the present invention to determine the real part of the complex impedance measured by the method described in Example 3 hereinbelow.

In the present invention, the anode is brought into electronically conductive contact with an anode current collector which is preferably a metal foil or mesh, most preferably copper. As in the case of the cathode, it may be advantageous to employ an adhesion promoter there-between. Of course for optimum operation, it is desirable to minimize the contact resistance between anode and anode current collector following the practices of the art.

In a preferred embodiment, the electrode films thus produced are then combined by lamination with the current collectors and separator. In order to ensure that the components so laminated or otherwise combined are in excellent ionically conductive contact with one another, the components are combined with an electrolyte solution comprising an aprotic solvent, preferably an organic carbonate as hereinabove described, and a lithium imide or methide salt represented by the formula

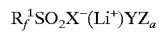

R$_f^1$SO$_2$X$^-$(Li$^+$)YZ$_a$ wherein X is C or N, a=0 or 1 with the proviso that a=1 when X is C and a=0 when X is N; wherein when a=1, Y and Z independently are electron-withdrawing groups selected from the group consisting of CN, SO$_2$R$_f^2$, SO$_2$R, P(O)(OR)$_2$, CO$_2$R, P(O)R$_2$, C(O)R$_f^3$, C(O)R, cycloalkenyl groups formed therewith, and, H, with the proviso that Y and Z cannot both be H; wherein further R$_f^1$, R$_f^2$ and R$_f^3$ are perfluoroalkyl radicals of 1–4 carbons optionally substituted with one or more ether oxygens; R is an alkyl group of 1–6 carbons optionally substituted with one or more ether oxygens, or an aryl group optionally further substituted; or wherein, when a=0, Y is an electron-withdrawing group represented by the formula —SO$_2$R$_f^6$ where R$_f^6$ is the radical represented by the formula —(R$_f^4$SO$_2$N$^-$(Li$^+$)SO$_2$)$_m$R$_f^5$ where m=0 or 1, and R$_f^4$ is —C$_n$F$_{2n}$— and R$_f^5$ is —C$_n$F$_{2n+1}$ where n=1–4, optionally substituted with one or more ether oxygens. Preferably, X is N, m=0, and R$_f^1$ and R$_f^5$ are —CF$_3$.

The means by which the layers comprising a complete cell or battery of the present invention are assembled into the final working battery or cell are not critical to the cell of the present invention. One of skill in the art will appreciate that a wide diversity of methods for assembling batteries, including lithium and lithium-ion batteries have been disclosed in the art and are outlined above. For the purposes of the present invention, any such method which is compatible with the particular chemical and mechanical requisites of a given embodiment of the present environment is suitable.

Preferred is the method of Gozdz et al. in U.S. Pat. Nos. 5,456,000 and 5,540,741, a plasticized composition is cast and formed, the plasticizer extracted and the electrolyte added to the dry cell structure. More preferred is to fabricate a cell comprising the graphite foil and imide or methide salt of the present invention according to the steps of the process described in Barton et al. copending U.S. patent application Ser. No. 09/383,129, wherein the activated electrode material is melt processed, most preferably by continuous extrusion, into the form of a sheet and is laminated to the other components of the battery in a single continuous operation.

The present invention is further described in the following specific embodiments which are intended merely as representative of some preferred embodiments of the present invention.

EXAMPLES

In the following specific examples, capacity retention as a function of discharge rate is determined. Each test cell as depicted in FIG. 1 was first fabricated in the discharged state. After fabrication, using a Maccor 9100 tester, it was subject to charging at a current 7.5 mA to a voltage of 4.15 V, followed by discharging at a constant current of 10 mA to 2.7 V. The cell was cycled five times between 2.7 V and 4.15 V at a constant current of 10 mA. Following this formation, the cell was discharged at a constant current of 15 mA and the time for the voltage to drop from 4.15 to 2.7 V was measured to provide the slow discharge rate capacity reference point. The cell was then charged again at 15 mA to 4.15 V, and discharged through the same voltage range at progressively higher constant currents in repeated charge and discharge cycles, with the capacity being expressed as a percentage of the reference discharge capacity.

Example 1

A cell was fabricated by the process of Gozdz et al. in U.S. Pat. Nos. 5,456,000 and 5,540,741, however flexible graphite foil was employed as the cathode current collector and the salt was $(CF_3SO_2)_2NLi$.

Cathode film was made by mixing in acetone solvent 65 parts $LiCoO_2$ (FMC Corp.), 6.5 parts Super P carbon black (MMM Carbon), 10 parts KYNAR FLEX® 2801 (Elf Atochem), and 18.5 parts dibutyl phthalate. Films were cast using the doctor blade technique and the acetone evaporated, providing cathode with a coating weight of 19.1 mg/cm$^2$ and a thickness as-cast of approximately 79 µm. Anode film was made by mixing in acetone solvent 65 parts MCMB 2528 (Osaka Gas), 3.3 parts Super P carbon black, 10 parts KYNAR FLEX® 2801, and 21.7 parts dibutyl phthalate. After casting and acetone evaporation, the anode film had a coating weight of 17.5 mg/cm$^2$ and a thickness of approximately 109 µm. Separator film was made by mixing in acetone solvent 26 parts fumed silica (Cabot TS530), 32 parts KYNAR FLEX® 2801, and 42 parts dibutyl phthalate. The separator film had a thickness of 41 µm.

GTY grade Grafoil® foil was obtained from UCAR Carbon Co. Inc., Cleveland, Ohio. Thickness was 75 µm, electron resistivity was $8 \times 10^{-6}$ Ohm-m in the xy plane, and density was 1.12 g/cm$^3$. The graphite foil was sprayed with an adhesion promoter consisting of a mixture of Adocote® 50C12 emulsion (Morton International Inc., Chicago, Ill., a copolymer of acrylic acid and ethylene), carbon black (MMM Super P), and ethanol such that the dried adhesion promoter layer consisted of 67% by weight resin and 33% by weight carbon black. The coating weight was determined to be 500 µg/cm$^2$. A piece of graphite current collector was cut from the sprayed graphite foil using a blade. The current collector was "L" shaped as depicted in FIG. 1. The area in contact with the cathode was 45 mm by 55 mm rectangular. The tabs for external electrical connections were 2.5 cm wide and 6 cm long strips.

A cell was made by forming the collectors and films described above into the layered structure G/C/C/S/A/Cu, where G indicates the Grafoil® layer, C, the two layers of cathode film, 45×55 mm, S, the separator layer, A, 50×60 mm the anode layer, 45×55 mm and Cu, a copper mesh current collector treated with Adocote® adhesion promoter.

Using a Western Magnum XRL120 laminator (Western Magnum, El Segundo, Calif.), two layers of cathode film were laminated to the Grafoil at 125° C., with a nip pressure of 69 kPa, and a roll speed of 0.25 m/min. In forming the laminate, a shim was employed which was approximately 12.5 µm thinner than the combined thickness of the cathode and Grafoil®.

Figure 2:
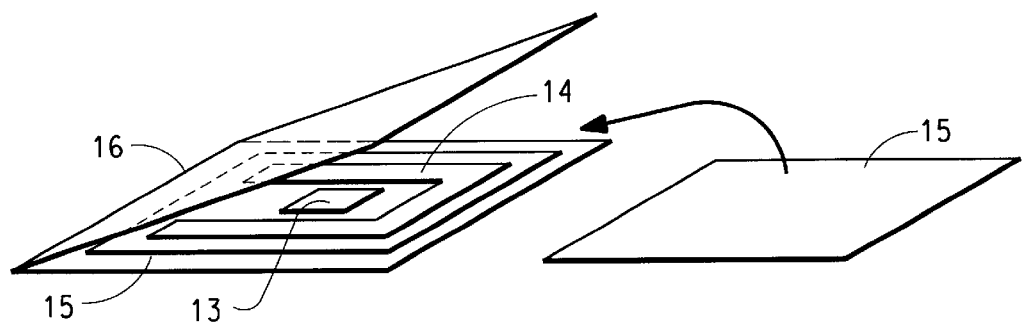
FIG. 2 shows the stepwise manner of assembly employed in the Examples described below.

This method for forming the laminates employed in the specific embodiments disclosed herein may be further understood by reference to FIG. 2. The layers to be laminated are first arrayed one on top of the other to form a specimen. The specimen, 13, and the associated u-shaped brass shim, 14, having 10 inch "arms" separated by 3 inches and a thickness selected to provide the desired final laminate thickness, are sandwiched between two Kapton® polyimide films, 15, available from the DuPontCompany, all within a brass jacket, 16, is used to hold the package together through the laminator.

The anode was laminated to the copper collector in the same manner. The separator was then placed between the laminated cathode and anode structures and the entire package went through a final lamination step at 95° C., 41.4 kPa nip pressure, and a roll speed of 0.3 m/min. A shim 20 µm thinner than the combined thickness was employed. Lamination of the components was performed in ambient air.

The dibutyl phthalate of the cell was removed by two successive extractions with excess diethyl ether, each 30 minutes in length. The cell was dried by heating to 80° C. under vacuum for 30 minutes, and then transferred into an Ar-filled dry box.

The salt $(CF_3SO_2)_2NLi$ (3M Company, MN) was dried under vacuum and 120° C. for 48 hours before use. An electrolyte solution was prepared by dissolving the salt at a concentration of 1.0 M in a solvent mixture of 2 parts by weight ethylene carbonate and 1 part by weight dimethyl carbonate (carbonates from EM Science, Selectipur® battery grade).

In a test according to means known in the art, the first cycle electrochemical efficiency was 87.8%. The accumulated capacity loss over five cycles was 1.9% of the 1$^{st}$ discharge capacity. The capacity at a 2C discharge rate was 85.3% of that determined for the same cell at a C/5 discharge rate. The capacity retention as a function of discharge current for the cell of Example 1 is shown in graphical form in FIG. 3.

Comparative Experiment A

The cell fabrication methods and materials of Example 1 including the electroytic salt solution of 1 M $(CF_3SO_2)_2NLi$ were followed except the cathode current collector was type 304 stainless steel. Using the same methods of evaluation as in Example 1, the first cycle electrochemical efficiency was 88.4% and discharge capacity loss accumulated over five cycles was 68.1%. 2C discharge rate capacity retention was not determined because of the rapid loss of capacity in the cell.

Example 2

In this embodiment, the Grafoil® of Example 1 was employed as therein described. All the solid components were dried under vacuum at 120° C. and contained less than 30 ppm $H_2O$. Unless stated otherwise, all the processing after the drying step was carried out inside an argon-filled dry box. The binder in the electrodes and the polymer in the separator were lithium sulfonate form of a hydrolyzed copolymer of vinylidene fluoride (VF) and perfluorosulfonyl fluoride ethoxy propyl vinyl ether (PSEPVE), prepared according to the method of Doyle et al., U.S. Pat. No. 6,025,092. The polymer contained 9~10 mol % of PSEPVE and had a molecular weight estimated to be ca. 200,000 Da. The solvent was a 2:1 by weight mixture of ethylene carbonate (EC, battery grade from EM Industries, Hawthorne, N.Y.) and butylene carbonate (JEFFSOL® BC, Huntsman Corporation, Salt Lake City, Utah)

A cathode composition was prepared by combining, 8.7 g of the binder, 7 g of Super P carbon black from MMM Carbon, 58 g of $LiCoO_2$ obtained from FMC Corporation, and 26.3 g of the EC/BC mixture.

The anode composition was prepared by combining 8 g of the same polymer as in the cathode, 4.5 g of the carbon black, 64 g of mesocarbon microbeads (MCMB grade 2528) obtained from OSAKA Gas, and 23.5 g of the mixture of EC/BC.

The separator was formed from a composition consisting of 25% by weight of the same polymer, 75% of the EC/BC.

The anode and cathode compositions were prepared by respectively mixing the dry components in a Waring blender for about 1 minute. The EC/BC solvent mixture was added to the blender and blending was continued for an additional minute. While still in the dry box, the mixture so formed was added to the mixing chamber of a Haake Rhomix® 600 mixer (Haake (USA), Paramus, N.J.) equipped with roller rotors and mixed at about 5 rpm and 125° C. for 20 minutes. The resultant mixture was quickly removed from the mixer and placed into a glass jar within 1 min. The thus prepared composition was taken outside of the dry-box in a sealed Kapton® polyimide bag and predensified in the bag at 125° C. on a Carver Model M hydraulic press (Fred Carver Inc., Menomonee Falls, Wis.) for 3 minutes at 30 psi compression pressure on the sample. The resultant film was taken back into the dry box.

Figure 3:
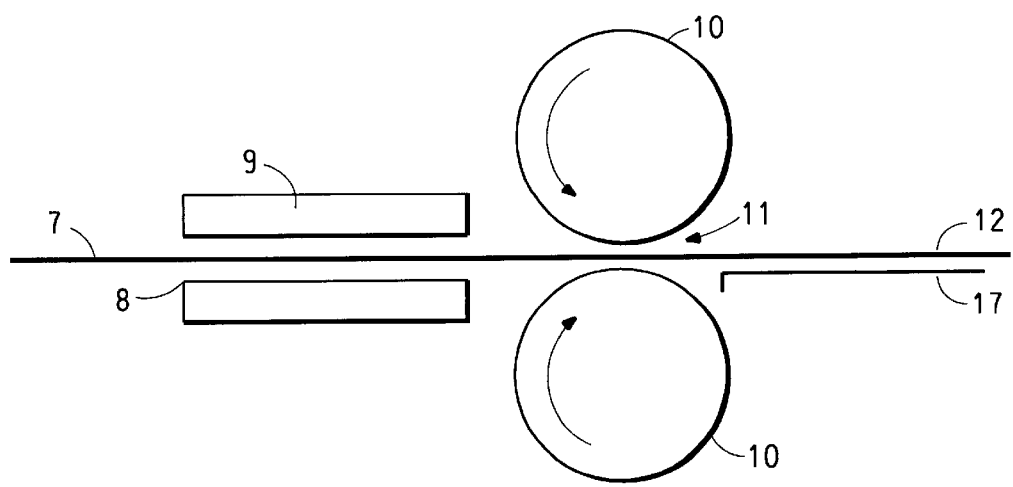
FIG. 3 is a diagram of the laminator employed in fabricating the specific embodiments of the invention hereinbelow described.
Figure 4:
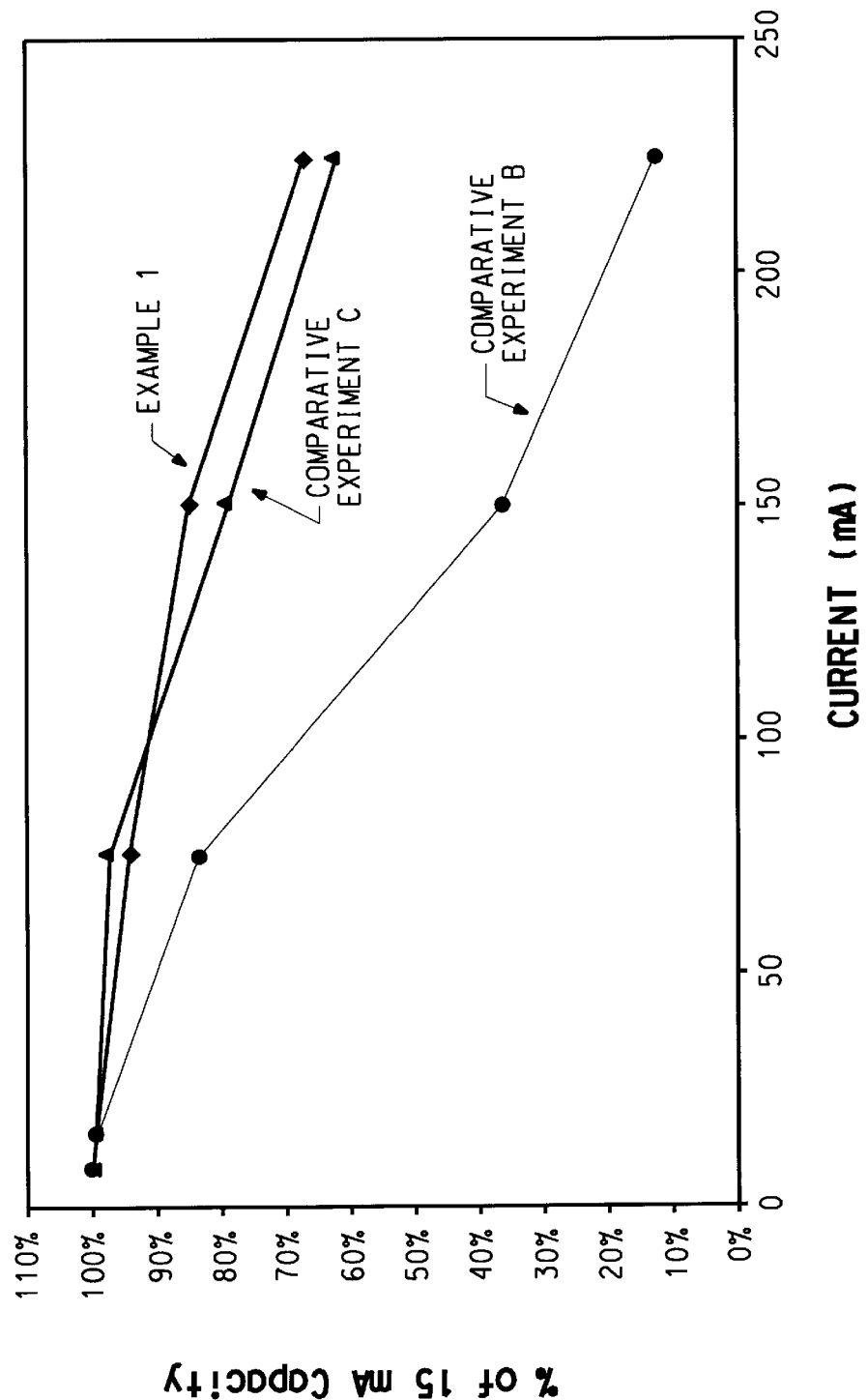
FIG. 4 is a graph showing the capacity retention as a function of discharge current for Comparative Experiment B, Comparative Experiment C, and Example 2.

The calender employed for preparing the cell is shown schematically in FIG. 3. The layered cell components, 7, were fed to a horizontal inlet heater assembly consisting of bottom heated feed plate, 8, having a width of 218 mm and a length of 205 mm, and a top heated plate, 9, having a width of 154 mm and a length of 205 mm, the top heated plate, 9, being disposed above the bottom heated feed plate, 8, a sufficient distance to permit the introduction of the layered cell components, 7, without touching the top heated plate. The entire inlet heater assembly is in the form of an electrically heated hollow tube of rectangular cross-section. From the inlet heater assembly, the layered cell components are introduced into the gap, 11, formed between two polished, electrically heated chrome-surfaced nip-rolls, 10, 100 mm in diameter and 155 mm wide, one of which rolls, 10, is driven, the gap being adjustable within the range of 0.025 to 0.250 mm. After passing through the nip-rolls the now laminated cell strip, 12, is fed out via an exit plate, 17, having a width of 210 mm and a length of 165 mm.

The anode and cathode films prepared in the hydraulic press, as above described, were calendered at 130° C. roller temperature after 2 min preheating in the inlet heater assembly at 135° C., then passed through the nip rolls at a total nip force of 260 kg and roller speed of 0.1 m/min. A 45 mm×55 mm electrode film was cut from the calendered film with a blade.

The separator was prepared by first mixing the polymer with the EC/BC using a spatula. The mixture was spread manually between two sheets of Kapton® polyimide film as described hereinabove with reference to FIG. 2 utilizing a 5 mil copper shim. The assembly so formed was preheated at 115° C. for 2 minutes, then calendered at a line speed of 0.1 m/min, at a total nip force of 170 kg, and a temperature of 125° C. to achieve 4 mil separator thickness. The laminator settings were: roller speed 0.1 m/min, roller force of 86 kg, 2 minutes preheating at 115° C. and the roller temperature at 125° C. A separator film (50 mm×60 mm) was cut from the film so prepared.

The cathode film was aligned to the top of the flexible graphite current collector (top being where the cathode tab sticks up as shown in FIG. 1), then laminated to the current collector. The laminator rolls was set at 125° C., 170 kg nip force, speed 0.25 m/min using a shim that was approximately 12.5 μm thinner than the combined thickness of the cathode and collector.

The anode was aligned to the top of the Adocote treated Cu mesh where the tab sticks up as shown in FIG. 1, then laminated to the Cu mesh current collector under the same conditions as those employed for the cathode.

The separator was positioned between the laminated anode and cathode according to the method hereinabove described with reference to FIG. 2 and the entire package went through a final lamination step at 95° C., 6.0 psi nip pressure, and line speed 0.3 m/min with a shim that was approximately 12.5 μm thinner than the combined thickness of the cell components.

The resulting cell was then soaked in the LiTFSI electrolyte of Example 1 for 60 minutes. The soaking took place in a petri dish. The weight of the electrolyte the cell absorbed was 0.318 g. The cell was then sealed in a bag. The bag material used was class ES material from Shield Pack (West Monroe, La.). The sealer used was a hand-held Audion Futura Poly Twin model (Packaging Aids Corp., San Rafael, Calif.).

The sealed bag was transferred outside the dry-box and was sealed again with a floor mounted Model 20A V-60966 (Vertrod, Brooklyn, N.Y.), which was a water-cooled impulse type sealer. The resulting cell is depicted in FIG. 1.

The first cycle electrochemical efficiency was determined to be 78.2%. The accumulated capacity loss over five cycles was 3.1% of the $1^{st}$ discharge capacity. This cell was not subject to the 2C discharge rate test because the cell developed an internal short circuit after the initialization cycles. Therefore, no further test was done. The loss after the five initialization cycles was 3.1%, more than the cell of Example 1, but still much better than that of Comparative Example A.

Comparative Experiment B

A cell was fabricated according to the method of Example 1 except that the LiTFSI solution was replaced by a 1 M solution of $LiCF_3SO_3$ in EC/DMC (2:1 by weight). $LiCF_3SO_3$ was obtained from Aldrich and dried under vacuum at 120° C. for 48 hours. The end moisture content was 10 ppm. Selectipur® EC and DMC was obtained from EM Industries Inc. The cell performance was evaluated in the same manner as in Example 1. First cycle electrochemical efficiency was 89.6%. The accumulated capacity loss over five cylces was 1.4% of the first discharge capacity. 2C discharge rate capacity was 35.7% of that at C/5.

The capacity retention as a function of discharge current for the cell of Comparative Experiment B is shown in graph form in FIG. 3.

Comparative Experiment C

A cell was fabricated according to the method of Example 1 except that the cathode currect collector was aluminum mesh and the LiTFSI solution was replaced by a 1 M solution of LiPF$_6$ in EC/DMC (2:1 by weight).

The aluminum mesh 2A15-077 (Delker Corporation, Branford, Conn.) was treated with a adhesion promoter as in the case of the graphite foil in EXAMPLE 1. Battery grade LiPF$_6$ (Hashimoto Chemical) was used as received. Selectipur® EC and DMC was obtained from EM Industries Inc. The cell performance was evaluated in the same manner as in Example 1. First cycle electrochemical efficiency was 90.4%. 2C discharge rate capacity was 79.8% of that at C/5, which is less than the cell in EXAMPLE 1, which used the graphite foil and LiTFSI combination. Results are depicted in FIG. 3.

Example 3

The contact impedance of the cathode-graphite collector interface was measured as follows. Using the cathode film from Example 1, untreated Grafoil, and laminating films together at 135° C., the structure C/G/C/C/G/C was fabricated, where C is cathode and G is Grafoil. Tabs of the Grafoil extended out beyond the cathodes, and the size of the cathodes was 2.2 cm×5.0 cm. Using a four-point-probe AC voltmeter, the impedance was measured between the two Grafoil pieces. The impedance at frequencies between 1 Hz and 10 kHz was found to be almost entirely real (resistive) with very little imaginary (capacitive) component, and of 0.5 ohm magnitude. The observed resistance was much higher than that calculated based on the bulk electrical conductivity of the cathode, hence the impedance is a measure of resistance at the interfaces between the cathodes and the current collectors. As the structure has 2 C/G interfaces in series, the contact impedance for one C/G interface was calculated as 0.5 ohm×2.2 cm×5.0 cm×(1/2)=2.8 ohm cm$^2$.

Example 4

An anode composition was formed by combining 39 g of MCMB, 4.8 g of KYNAR Flex® 2801, 14.4 g of an electrolyte solution of 1 M Li(CF$_3$SO$_2$)$_2$N in a 1:1 by weight mixture of EC and PC (propylene carbonate) electrolyte solution, and 1.8 g of carbon black. A cathode composition was formed by combining 52 g of LiCoO$_2$, 5.6 g of KYNAR Flex® 2801, 17 g of the above electrolyte solution, and 5.6 g of carbon black. A separator composition was formed by combining 1 part of KYNAR Flex® 2801 with 2.4 parts of the electrolyte solution, and 0.4 parts of fumed silica (Cab-O-Sil®, Ts530, Cabot Corporation).

Following the procedures and using the equipment of Example 2, the dry components were combined in a Waring blender for 1 minute. The blender jar and its contents were then heated on a covered hot plate to 130° C. for 30 minutes. Then blending was continued a slow speed while the electrolyte solution was added. The resulting mixture was blended for an additional minute with the blender jar capped. The blended mixture was fed to a Haake Rhomix® 600 mixer with roller rotors (order no. 557-1030) and mixed at 125° C. for 20 minutes at 1 rpm in the case of the anode composition and at 20 rpm in the case of the cathode composition. The resulting mixture was then subject to hot pressing at 125° C. and approximately 300 psi compression on the sample followed by calendering according to the method of Example 2.

The separator composition was also fabricated into a separator film according to the method of Example 2.

The cathode film was aligned to the top of the flexible graphite current collector treated with adhesion promoter as described in Example 1, then laminated to the current collector. The laminator rolls were set at 125° C., 170 kg nip force, speed 0.25 m/min using a shim that was approximately 12.5 µm thinner than the combined thickness of the cathode and collector.

The anode was aligned to the top of the Adocote treated Cu mesh where the tab sticks up, then laminated to the Cu mesh current collector under the same conditions as those employed for the cathode.

The separator was positioned between the laminated anode and cathode and the entire package went through a final lamination step at 95° C., 100 kg nip force, speed 0.3 m/min with a shim that is approximately 12.5 µm thinner than the combined thickness of the cell components.

The cell was then sealed in a bag. The bag material used was class ES material from Shield Pack (West Monroe, La.). The sealer used was a hand-held Audion Futura Poly Twin model (Packaging Aids Corp., San Rafael, Calif.).

The sealed cell was transferred outside the dry-box and was sealed again with a floor mounted Model 20A V-60966 (Vertrod, Brooklyn, N.Y.), which is water-cooled impulse type sealer.

The cell performance was evaluated in the same manner as in Example 1. First cycle electrochemical efficiency was 86.9%. The accumulated capacity loss over five cycles was 3.7% of the first discharge capacity. 2C discharge rate capacity was 52.4% of that at C/5.

What is claimed is:

1. A lithium-ion electrochemical cell, the cell comprising an anode comprising an anode active material, an anode current collector in electronically conductive contact with said anode; a cathode exhibiting an upper charging voltage in the range of 3 to 5 volts with respect to a Li/Li$^+$ reference electrode, said cathode comprising a lithium insertion transition metal oxide, phosphate, or sulfate in electronically conductive contact with a graphite sheet cathode current collector, said graphite sheet cathode current collector being characterized by a purity of>95%, a thickness of less than 250 micrometers, a bulk density of 0.08–2.25 g/cc, an electrical conductivity of at least 500 Siemens/cm, and said electronically conductive contact being characterized by a resistance of less than 50 ohm-cm$^2$; an ion-permeable membrane as a separator between said cathode and anode; and an electrolyte solution being in ionically conductive contact with said anode and cathode, the electrolyte solution comprising an aprotic polar solvent or a polymer, and a lithium compound at a concentration in the range of 0.2 up to 3 molar, said lithium compound being represented by the formula

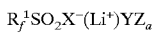

$$R_f^1SO_2X^-(Li^+)YZ_a$$

wherein X is C or N, a=0 or 1 with the proviso that a=1 when X is C and a=0 when X is N; wherein when a=1, Y and Z independently are electron-withdrawing groups selected from the group consisting of CN, SO$_2$R$_f^2$, SO$_2$R, P(O)(OR)$_2$, CO$_2$R, P(O)R$_2$, C(O)R$_f^3$, C(O)R, cycloalkenyl groups formed therewith, and, H, with the proviso that Y and Z cannot both be H; wherein further R$_f^1$, R$_f^2$ and R$_f^3$ are perfluoroalky radicals of 1–4 carbons optionally substituted with one or more ether oxygens; R is an alkyl group of 1–6 carbons optionally substituted with one or more ether oxygens, or an aryl group optionally further substituted; or wherein, when a=0, Y is an electron-withdrawing group represented by the formula —SO$_2$R$_f^6$ where R$_f^6$ is the radical represented by the formula —(R$_f^4$SO$_2$N$^-$(Li$^+$)SO$_2$)$_m$ R$_f^5$ where m=0 or 1, and R$_f^4$ is —C$_n$F$_{2n}$— and R$_f^5$ is —C$_n$F$_{2n+1}$ where n=1–4, optionally substituted with one or more ether oxygens.

2. The electrochemical cell of claim 1 wherein the anode active material is carbon selected from the group consisting of graphite microbeads, natural graphites, carbon fibers, or graphitic flakes.

3. The electrochemical cell of claim 1 wherein the anode active material or the lithium insertion transition metal oxide, phosphate, or sulfate, or both, are in particulate form said particulates ranging in size from 1 to 100 micrometers in average equivalent spherical diameter.

4. The electrochemical cell of claim 1 wherein the cathode exhibits an upper charging voltage in the range of 3.5 to 4.5 volts with respect to a $Li/Li^+$ ref. electrode.

5. The electrochemical cell of claim 1 wherein the lithium insertion transition metal oxide, phosphate or sulfate is selected from the group consisting of $LiCoO_2$, spinel $LiMn_2O_4$, chromium-doped spinel lithium manganese oxides, layered $LiMnO_2$, $LiNiO_2$, $LiNi_xCo_{1-x}O_2$ where x is 0<x<1, vanadium oxides, $LiFePO_4$, and $LiFeTi(SO_4)_3$.

6. The electrochemical cell of claim 5 wherein the lithium insertion transition metal oxide, phosphate, or sulfate is a lithium insertion transition metal oxide selected from the group consisting of $LiCoO_2$, $LiMn_2O_4$, $LiNiO_2$, $LiNi_xCo_{1-x}O_2$ where x is 0<x<1, and derivatives thereof.

7. The electrochemical cell of claim 1 wherein the graphite sheet is characterized by a bulk density in the range of 0.8 to 1.4 grams per cubic centimeter.

8. The electrochemical cell of claim 1 wherein the graphite sheet has a thickness of less than 75 micrometers.

9. The electrochemical cell of claim 1 wherein the graphite sheet is characterized by an electrical conductivity of at least 1000 Siemens per centimeter in the plane of the sheet.

10. The electrochemical cell of claim 1 wherein the cathode current collector comprising graphite further comprises an adhesion promoter.

11. The electrochemical cell of claim 1 wherein the electrolyte solution comprises an organic carbonate.

12. The electrochemical cell of claim 11 wherein the organic carbonate is selected from the group consisting of ethylene carbonate, propylene carbonate, dimethyl carbonate, diethylcarbonate, and mixtures thereof.

13. The electrochemical cell of claim 1 wherein the concentration of the lithium compound in the electrolyte solution is in the range of 0–5 to 2 molar.

14. The electrochemical cell of claim 1 wherein the concentration of the lithium compound in the electrolyte solution is in the range of 0.8 to 1.2 molar.

15. The electrochemical cell of claim 1 wherein the lithium compound is represented by the formula $$CF_3SO_2N^-(Li^+)SO_2CF_3.$$

16. The electrochemical cell of claim 1 wherein the cathode current collector is a graphite sheet having a purity of >95%, a bulk density in the range of 0.8 to 1.4 grams per cubic centimeter, a thickness of less than 75 micrometers; and, an electrical conductivity of at least 1000 Siemens per centimeter in the plane of the sheet; and the electrolyte solution is a 0.5–2 molar solution of a lithium compound in an organic carbonate selected from the group consisting of ethylene carbonate, propylene carbonate, dimethyl carbonate, diethylcarbonate, and mixtures thereof; the lithium compound being represented by the formula $$CF_3SO_2N^-(Li^+)SO_2CF_3.$$

* * * * *